United States Patent [19]

Kerth et al.

[11] Patent Number: 4,977,210
[45] Date of Patent: Dec. 11, 1990

[54] PREPARATION OF PROPYLENE/ETHYLENE POLYMERS OF THE TOUGHENED POLYPROPYLENE TYPE

[75] Inventors: Juergen Kerth, Carlsberg; Rainer A. Werner, Bad Duerkheim; Ralf Zolk, Weisenheim; Klaus-Dieter Ruempler, Wachenheim; Guenther Schweier, Friedelsheim; Rudolf Mueller-Mall, Neuhofen; Wolfgang Gruber, Frankenthal, all of Fed. Rep. of Germany

[73] Assignee: BASF Aktiengesellschaft, Ludwigshafen, Fed. Rep. of Germany

[21] Appl. No.: 389,818

[22] Filed: Aug. 4, 1989

[30] Foreign Application Priority Data

Aug. 13, 1988 [DE] Fed. Rep. of Germany ....... 3827565

[51] Int. Cl.$^5$ .................... C08L 23/12; C08L 23/16; C08F 297/08
[52] U.S. Cl. ...................................... 525/53; 525/322; 525/323; 525/247; 525/270
[58] Field of Search .......................... 525/53, 322, 323

[56] References Cited

U.S. PATENT DOCUMENTS

| 4,284,738 | 8/1981 | Zubowski | 525/53 |
| 4,454,299 | 6/1984 | Schweier et al. | |
| 4,455,405 | 6/1984 | Jaggard et al. | |
| 4,771,103 | 9/1988 | Chiba et al. | 525/323 |
| 4,882,380 | 1/1989 | Ficker et al. | 525/53 |

FOREIGN PATENT DOCUMENTS 1354020 7/1986 United Kingdom .

Primary Examiner—Carman J. Seccuro
Attorney, Agent, or Firm—Keil & Weinkauf

[57] ABSTRACT

Propylene/ethylene block copolymers are prepared by a continuous process in which, in each case in an agitated fixed bed of finely divided polymer from the gas phase, first (I) in a first polymerization zone, propylene is homopolymerized by feeding in a Ziegler-Natta catalyst system consisting of (1) a titanium component which contains titanium, magnesium, chlorine and a phthalic acid derivative, (2) an aluminumalkyl component and (3) a silane component, and (II) in a second polymerization zone, a mixture of propylene and ethylene is polymerized with the propylene homopolymer present in the reaction mixture obtained in the first polymerization zone by feeding in the said reaction mixture. In the process, (A) a titanium component (1) is used which is obtained by a method in which (1.1) first, (1.1.1) in a liquid hydrocarbon, (1.1.2) a finely divided magnesium halide, (1.1.3) an alkanol, (1.1.4) a certain phthalic acid derivative and (1.1.5) titanium tetrachloride are reacted with one another under certain conditions, (1.2) the solid intermediate obtained from (1.1) is extracted with titanium tetrachloride or a liquid alkylbenzene until the remaining solid substance has become substantially richer in magnesium, and (1.3) finally, the solid substance remaining in (1.2) is washed with an alkane in a certain manner, (B) a specific silane is used as (3), and (C) specifically selected polymerization parameters are employed, with relationships between the first and second polymerization zones.

1 Claim, No Drawings

PREPARATION OF PROPYLENE/ETHYLENE POLYMERS OF THE TOUGHENED POLYPROPYLENE TYPE

The present invention relates to a process for the continuous preparation of propylene/ethylene polymers of the toughened polypropylene type, in which, in each case in the presence of hydrogen as a molecular weight regulator, in an agitated fixed bed of finely divided polymer, in the absence of a liquid reaction medium, from the gas phase, first (A) in a first polymerization zone, propylene is homopolymerized by feeding in a Ziegler-Natta catalyst system consisting of (1) a titanium component which is based on a finely divided, shape-imparting silica gel and contains titanium, magnesium, chlorine and a benzenecarboxylic acid derivative, (2) an aluminum component of the formula $$Al\ R_3,$$

where R is alkyl of not more than 8, in particular not more than 4, carbon atoms, and (3) a silane component of the formula $$R_n^1 Si(OR^2)_{4-n},$$

where $R^1$ is a saturated aliphatic and/or aromatic hydrocarbon radical of not more than 16, preferably not more than 10, carbon atoms, $R^1$ is alkyl of not more than 15, preferably not more than 8, in particular not more than 4, carbon atoms and n is from 0 to 3, preferably from 0 to 2, in particular 1 or 2, with the provisos that (i) the atomic ratio of titanium from the titanium component (1) to aluminum from the aluminumalkyl component (2) is from 1:10 to 1:500, in particular from 1:20 to 1:200, (ii) the molar ratio of aluminumalkyl component (2) to silane component (3) is from 1:0.01 to 1:0.5, in particular from 1:0.02 to 1:0.2 and (iii) from 0.05 to 2, in particular from 0.2 to 1, kg of polymer are produced per millimole of the aluminumalkyl component (2), and then (B) in a second polymerization zone, a mixture of propylene and ethylene is polymerized with the propylene homopolymer present in the reaction mixture obtained in the first polymerization zone by feeding in the said reaction mixture.

A process of this type which is particularly interesting in this context has been disclosed in U.S. Pat. No. 4,455,405.

This process is carried out by a method in which propylene/ethylene polymers are prepared in each case in an agitated fixed bed of finely divided polymer, from the gas phase, in two successive polymerization zones, by feeding in a Ziegler-Natta catalyst system, under relatively mild polymerization conditions in the second polymerization zone. The process has the disadvantage that the resulting products have only moderate notched impact strengths, in particular at low temperatures, owing to the relatively small amounts of polymer formed in the second polymerization zone.

Further processes of the type under discussion have been disclosed in a number of variants, and reference may be made to, for example, U.S. Pat. No. 4,454,299 and South African Patent Nos. 0084/3561, 0084/3563 and 0084/5261 as typical publications.

These known processes and in particular the resulting products have in general proved satisfactory in industry; however, this does not mean that there are not still further requirements. Thus, if it is intended to produce polymers having particularly good performance characteristics, the known processes are still susceptible to faults during continuous operation, for example due to the formation of fragments and coatings in the reactor, and/or the polymers produced still have a relatively high content of undesirable inorganic impurities from the catalyst system used.

It is an object of the present invention to improve the process defined at the outset in such a way that it has the abovementioned disadvantages only to a considerably reduced extent, if at all.

We have found that this object is achieved if (α) a particular titanium component (1) is used and (β) the reaction is carried out using specifically selected polymerization parameters and relationships between the first and second polymerization zones.

The present invention accordingly relates to a process for the continuous preparation of propylene/ethylene polymers of the toughened polypropylene type, in which, in each case in the presence of hydrogen as a molecular weight regulator, in an agitated fixed bed of finely divided polymer (which is known technically to mean a bed of finely divided polymer which is kept in movement by stirring), in the absence of a liquid reaction medium, from the gas phase, first (A) in a first polymerization zone, propylene is homopolymerized by feeding in a Ziegler-Natta catalyst system consisting of (1) a titanium component which is based on a finely divided, shape-imparting silica gel and contains titanium, magnesium, chlorine and a benzenecarboxylic acid derivative, (2) an aluminum component of the formula $$Al\ R_3,$$

where R is alkyl of not more than 8, in particular not more than 4, carbon atoms, and (3) a silane component of the formula $$R_n^1 Si(OR^2)_{4-n},$$

where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1 or 2, with the provisos that (i) the atomic ratio of titanium from the titanium component (1) to aluminum from the aluminumalkyl component (2) is from 1:10 to 1:500, in particular from 1:20 to 1:200, (ii) the molar: ratio of aluminumalkyl component (2) to silane component (3) is from 1:0.01 to 1:0.5, in particular from 1:0.02 to 1:0.2 and (iii) from 0.05 to 2, in particular from 0.2 to 1, kg of polymer are produced per millimole of the aluminumalkyl component (2), and then (B) in a second polymerization zone, a mixture of propylene and ethylene is polymerized with the propylene homopolymer present in the reaction mixture obtained in the first polymerization zone by feeding in the said reaction mixture.

In the novel process, (a)

the titanium component (1) used is one which is obtained by a method in which first (1.1) in a first stage (I) a carrier is prepared from (Ia) a finely divided silica gel which has a particle diameter of from 1 to 1,000, preferably from 5 to 500, in particular from 10 to 200, μm, a pore volume of from 0.3 to 5.0, in particular from 1.0 to 3.0, cm$^3$/g and a surface area of from 100 to 1,000, in particular from 200 to 500, m$^2$/g, is of the formula SiO$_2$ . a Al$_2$O$_3$, where a is from 0 to 2, in particular from 0 to 0.5, and has a moisture content such that it loses from 1 to 20, preferably from 2 to 15, in particular from 4 to 10%, by weight, based on the initial total weight of the silica gel, of water at 1000° C. in the course of 0.5 hour, (Ib) an organomagnesium compound of the formula MgR$^3$R$^4$, where R$^3$ and R$^4$ are each C$_2$-C$_{10}$-alkyl, preferably C$_4$-C$_8$-alkyl, and (Ic) a gaseous chlorinating agent of the formula ClZ, where Z is Cl or H, preferably H, by a method in which first (1.1.1) in a first sub-stage, in a liquid inert hydrocarbon, in particular an alkane, with constant thorough mixing at from 10° to 120° C., in particular from 20° to 100° C., the finely divided silica gel (Ia) and the organomagnesium compound (Ib) are combined, from 1 to 10, in particular from 1.5 to 5, molar parts of the organomagnesium compound (Ib) being used per 10 molar parts of silicon of the silica gel (Ia), and the combined substances are kept at from 20° to 140° C., in particular from 60° to 90° C., for from 0.5 to 5, in particular from 1 to 2, hours, then (1.1.2) in a second sub-stage, with constant thorough mixing at from −20° to +80° C., in particular from 0 to +60° C., the gaseous chlorinating agent (Ic) is passed into the mixture obtained from the first sub-stage, from 2 to 40, in particular from 5 to 20, molar parts of the chlorinating agent (Ic) being used per molar part of the organomagnesium compound (Ib), the entire mixture is left at a temperature in the stated range for from 0.5 to 5 hours, in particular from 0.5 to 1 hour, and the resulting solid-phase product, ie. the carrier (I), is isolated with removal of the liquid phase, thereafter (1.2) in a second stage, a solid-phase intermediate is prepared from (I) the carrier obtained in the first stage, (II) a C$_1$-C$_8$-alkanol, in particular ethanol, (III) titanium tetrachloride and (IV) a phthalic acid derivative of the formula

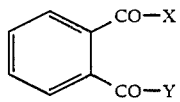

where X and Y together are oxygen or X and Y are each chlorine or C$_1$-C$_{10}$-alkoxy, preferably C$_1$-C$_8$-alkoxy, in particular butoxy, by a method in which first (1.2.1) in a first sub-stage, in a liquid inert hydrocarbon, in particular an alkane, with constant thorough mixing at room temperature, the carrier (I) and the alkanol (II) are combined, from 1 to 5, in particular from 2.5 to 3.5, molar parts of the alkanol (II) being used per molar part of magnesium of the carrier (I), and the combined substances are kept at from 20° to 140° C., in particular from 70° to 90° C., for from 0.5 to 5, in particular from 1 to 2, hours, then (1.2.2) in a second sub-stage, with constant thorough mixing at room temperature, the titanium tetrachloride (III) is introduced into the reaction mixture resulting from the first sub-stage, from 2 to 20, in particular from 4 to 8, molar parts of the titanium tetrachloride (III) being used per molar part of magnesium of the carrier (I), the combined substances are kept at from 10° to 150° C., in particular from 90° to 120° C., for from 0.5 to 5, in particular from 1 to 2, hours, and the resulting solid-phase intermediate is isolated with removal of the liquid phase, with the proviso that the phthalic acid derivative (IV) is introduced in the course of one or both of the substages (1.2.1) and (1.2.2), from 0.01 to 1, preferably from 0.1 to 0.8, in particular from 0.2 to 0.6, molar part of the phthalic acid derivative (IV) being used per molar part of magnesium of the carrier (I), then (1.3) in a third stage, the solid-phase intermediate obtained from the second stage is subjected, at from 100° to 150° C., in particular from 115° to 135° C., for from 0.2 to 5, in particular from 1.5 to 3, hours, to a single-stage, multistage or continuous extraction with titanium tetrachloride or a mixture of titanium tetrachloride and an alkylbenzene of not more than 12, preferably not more than 10, carbon atoms, in particular ethylbenzene, which contains not less than 5, in particular not less than 10%, by weight of titanium tetrachloride, a total of from 10 to 1,000, preferably from 20 to 800, in particular from 40 to 300, parts by weight of the extracting agent being used per 10 parts by weight of the solid-phase intermediate obtained from the second stage, and finally (1.4) in a fourth stage, the solid-phase product formed in the third stage is washed with a liquid inert hydrocarbon, in particular an alkane, until the hydrocarbon contains less than 2, preferably less than 1%, by weight of titanium tetrachloride, and the titanium component (1) is thus obtained, and (β)

polymerization is carried out by a method in which (a) in the first polymerization zone, the reaction is carried out under a total pressure of from 20 to 40, preferably from 22 to 35, bar and at from 60° to 90° C., preferably from 65° to 80° C., with the proviso that the mean residence time of the polymer is from 1.5 to 5, preferably from 2.5 to 4, hours, (b) in the second polymerization zone, the reaction is carried out under a total pressure of from 7 to 25, preferably from 11 to 20, bar and at from 40° to 70° C., preferably from 50° to 60° C., with the proviso that the ratio of the propylene partial pressure to the ethylene partial pressure is from 100:20 to 100:120, preferably from 100:30 to 100:60, (c) the total pressure in the first polymerization zone is kept at least 7 bar higher than the total pressure in the second polymerization zone, (d) the ratio of the weight of the propylene converted into polymer in the first polymerization zone to the weight of the propylene/ethylene mixture converted into polymer in the second polymerization zone is from 100:40 to 100:150, in particular from 100:50 to 100:130, and (e) the mean residence time of the polymer in the second polymerization zone is equal to the mean residence time of the polymer in the first polymerization zone multiplied by 0.8–1.2, preferably 0.9–1.1, times the quotient of the amount of polymer discharged per hour from the first polymerization zone and the amount of polymer discharged per hour from the second polymerization zone.

Regarding the novel process, the following may be noted specifically:

Provided that the defining features are taken into account, the polymerization process as such can be carried out in virtually any relevant conventional technological embodiment. These embodiments, ie. the technological variants of the continuous gas-phase block copolymerization of propylene/ethylene in two polymerization zones by the Ziegler-Natta method, are well known. Their development is reflected in the processes as disclosed first in British Patent No. 837,301, then in British Patent No. 1,006,469 and finally in British Patent No. 1,032,945, and it has proven advantageous to design each of the stages (I) and (II) of the process from the lastmentioned patent to correspond to the single stage of the process disclosed in British Patent No. 1,354,020.

Particular embodiments of the process under discussion, of a type to which the novel process also belongs, are likewise disclosed, for example by the U.S. Pat. No. 4,454,299 and the South African Patent Nos. 0084/3561, 0084/3563 and 0084/5261 cited at the outset.

Further explanations of the novel polymerization process as such are therefore unnecessary.

For the sake of completeness, it should however be mentioned that, in the novel process, the components of the catalyst system can be introduced into the first polymerization zone in a variety of ways, for example (i) the titanium component (1), the aluminumalkyl component (2) and the further catalyst component (3) all at the same point together, (ii) the same components all at different points, (iii) component (1) on the one hand and a mixture of components (2) and (3) on the other hand at different points, which may be particularly advantageous, or (iv) a mixture of components (1) and (3) on the one hand and component (2) on the other hand at different points.

Regarding the composition of the catalyst system to be used in the novel process, the following may be stated specifically:

(1) The titanium component is of a particular type; it is defined specifically above.

(2) The alkylaluminum component may be a relevant conventional one corresponding to the definition given above; triethylaluminum is preferred.

(3) The further catalyst component is a special silane of the above formula; the silane may be, in this respect, a relevant conventional one.

For the purposes of the present invention, toluyltriethoxysilane, diisopropyldimethoxysilane and isobutylisopropyldimethoxysilane have proven particularly useful.

EXAMPLE

In a relevant conventional apparatus (ie. a cascade; cf. British Patent No. 1,032,945), a propylene/ethylene polymer of the toughened polypropylene type was prepared continuously by a method in which, in each case in the presence of hydrogen as a molecular weight regulator, in an agitated fixed bed (a stirred concentric fixed bed) of finely divided polymer and in the absence of a liquid reaction medium, from the gas phase, first (A) in a first polymerization zone having an effective volume of 180 l, propylene was homopolymerized by feeding in, continuously and separately, a Ziegler-Natta catalyst system consisting of (1) a titanium component,
(2) aluminumtriethyl and
(3) isobutylisopropyldimethoxysilane, with the provisos that (i) the atomic ratio of titanium from the titanium component (1) to aluminum from the aluminumalkyl component (2) was 1:100, (ii) the molar ratio of aluminumalkyl component (2) to silane component (3) was 1:0.1 and (iii) 0.4 kg of polymer was produced per millimole of the aluminumalkyl component (2), and then (B) in a second polymerization zone having an effective volume of 180 l, a mixture of propylene and ethylene was polymerized with the propylene homopolymer present in the reaction mixture obtained in the first polymerization zone by feeding in the said reaction mixture.

According to the invention, the process was carried out specifically as follows:

(α)

the titanium component (1) used was one which was obtained by a method in which first (1.1) in a first stage (I) a carrier was prepared from (Ia) a finely divided silica gel which had a particle diameter of from 20 to 45 $\mu$m, a pore volume of 1.75 cm$^3$/g and a surface area of 320 m$^2$/g, was of the formula SiO$_2$ and had a moisture content such that it lost 7.4% by weight, based on the initial total weight of the silica gel, of water at 1000° C. in the course of 0.5 hour (method of measurement: differential thermogravimetry), (Ib) butyloctylmagnesium and (Ic) hydrogen chloride, by a method in which first (1.1.1) in a first sub-stage, in n-heptane, with constant thorough mixing by means of stirring at room temperature, the finely divided silica gel (Ia) and the organomagnesium compound (Ib) were combined, 3.3 molar parts of the organomagnesium compound (Ib) being used per 10 molar parts of silicon of the silica gel (Ia), and the combined substances were kept at about 90° C. for 1.5 hours, then (1.1.2) in a second sub-stage, with constant thorough mixing by means of stirring at about 20° C., the gaseous chlorinating agent (Ic) was passed into the mixture obtained from the first sub-stage, 10 molar parts of the chlorinating agent (Ic) being used per molar part of the organomagnesium compound (Ib), the entire mixture was left at a temperature in the stated range for 0.5 hour and the resulting solid-phase product, ie. the carrier (I), was isolated with removal of the liquid phase, thereafter (1.2) in a second stage, a solid-phase intermediate was prepared from (I) the carrier obtained in the first stage, (II) ethanol, (III) titanium tetrachloride and (IV) di-n-butyl phthalate, by a method in which first (1.2.1) in a first sub-stage, in n-heptane, with constant thorough mixing by means of stirring at room temperature, the carrier (I) and the ethanol (II) were combined, 3 molar parts of the ethanol (II) being used per molar part of magnesium of the carrier (I), and the combined substances were kept at about 80° C. for 1.5 hours, then (1.2.2) in a second sub-stage, with constant thorough mixing by means of stirring at room temperature, the titanium tetrachloride (III) was introduced into the reaction mixture resulting from the first sub-stage, 6 molar parts of the titanium tetrachloride (III) being used per molar part of magnesium of the carrier (I), and then the di-n-butyl phthalate was introduced, 0.50 molar part of the phthalate (IV) being used per molar part of magnesium of the carrier (I), the combined substances were kept at about 120° C. for 2 hours while stirring, and the resulting solid-phase intermediate was isolated with removal of the liquid phase by filtration under suction, then (1.3) in a third stage, the solid-phase intermediate obtained from the second stage was subjected, at 125° C., for 2 hours, to a continuous extraction with a mixture of titanium tetrachloride and ethylbenzene, which contains 15% by weight of titanium tetrachloride, 140 parts by weight of the titanium tetrachloride/ethylbenzene mixture being used per 10 parts by weight of the solid-phase intermediate obtained from the second stage, after which the resulting solid-phase intermediate was isolated by filtration, and finally (1.4) in a fourth stage, the solid-phase product obtained in the third stage was washed with n-heptane until the n-heptane contained less than 0.3% by weight of titanium tetrachloride, and the titanium component (1) was thus obtained; it contained 3.1% by weight of titanium, 7.5% by weight of magnesium and 28.3% by weight of chlorine.

(β)

Furthermore, polymerization was carried out by a method in which (a) in the first polymerization zone, the reaction was carried out under a total pressure of 28 bar and at 70° C., with the proviso that the mean residence time of the polymer was 3.0 hours, (b) in the second polymerization zone, the reaction was carried out under a total pressure of 20 bar and at 60° C., with the proviso that the ratio of the propylene partial pressure to the ethylene partial pressure was 100:43, (c) the total pressure in the first polymerization zone was thus kept 8 bar higher than the total pressure in the second polymerization zone, (d) the ratio of the propylene converted into polymer in the first polymerization zone to the weight of the propylene/ethylene mixture converted into polymer in the second polymerization zone was 100:105 and (e) the mean residence time of the polymer in the second polymerization zone (1.47 hours) was equal to the mean residence time of the polymer in the first polymerization zone (3.0 hours), multiplied by the quotient of the amount of polymer discharged hourly from the first polymerization zone (15.1 kg/h) and the amount of polymer discharged hourly from the second polymerization zone (30.9 kg/h), ie. 1.47=3.0×1×15.1:30.9 kg/h.

In this procedure, a propylene homopolymer having a melt flow index (measured at 230° C., 2.16 kg) of 8 g/10' was formed in the first polymerization zone and a polymer having a melt flow index of 1.4 g/10, was formed in the second polymerization zone.

The continuous operation for the production of the propylene/ethylene polymer of the toughened polypropylene type could be carried out without problems in the manner described; furthermore the product obtained had a low content of inorganic impurities, in particular of chlorine and titanium; analysis of this product gave the following:

Ti:<1 ppm, Cl:6 ppm, Al:82 ppm, Mg:2 ppm, Si:3 ppm.

The physical properties of the polymer obtained are shown in the Table below.

TABLE

| Melt flow index[a] | Particle size distribution[b] | | | | | | Mean particle diameter[c] | Free-flowing properties[d] | Notched impact strength[e] |
|---|---|---|---|---|---|---|---|---|---|
| (230° C./2.16 kg) | <0.125 mm | 0.125–0.25 | 0.25–0.5 | 0.5–1.0 | 1.0–2.0 | >2 | (mm) | (g/s) | (kJ/m$^2$) |
| 1.4 g/10 min | 0% | 0.1% | 0.3% | 8.2% | 62.5% | 28.9% | 1.92 | 32.3 | No fracture |

[a] According to DIN 53,753
[b] By sieve analysis
[c] By sieve analysis
[d] According to DIN 53,492
[e] According to DIN 53,453

We claim:
1. A process for the continuous preparation of a propylene/ethylene polymer of the toughened polypropylene type, in which, in each case in the presence of hydrogen as a molecular weight regulator, in an agitated fixed bed of finely divided polymer, in the absence of a liquid reaction medium, from the gas phase, first

(A) in a first polymerization zone, propylene is homopolymerized by feeding in a Ziegler-Natta catalyst system consisting of
(1) a titanium component which is based on a finely divided, shape-imparting silica gel and contains titanium, magnesium, chlorine and a benzenecarboxylic acid derivative,
(2) an aluminum component of the formula $$Al\ R_3,$$

where R is alkyl of not more than 8 carbon atoms, and
(3) a silane component of the formula $$R_n^1 Si(OR_2)_{4-n},$$

where $R_1$ is a saturated aliphatic and/or aromatic hydrocarbon radical of not more than 16 carbon atoms, $R^2$ is alkyl of not more than 15 carbon atoms and n is from 0 to 3,
with the provisos that (i) the atomic ratio of titanium from the titanium component (1) to aluminum from the aluminumalkyl component (2) is from 1:10 to 1:500, (ii) the molar ratio of aluminumalkyl component (2) to silane component (3) is from 1:0.01 to 1:0.5 and (iii) from 0.05 to 2 kg of polymer are produced per millimole of the aluminumalkyl component (2), and then (B) in a second polymerization zone, a mixture of propylene and ethylene is polymerized with the propylene homopolymer present in the reaction mixture obtained in the first polymerization zone by feeding in the said reaction mixture, wherein
(α)
the titanium component (1) used is one which is obtained by a method in which first
(1.1) in a first stage (I) a carrier is prepared from (Ia) a finely divided silica gel which has a particle diameter of from 1 to 1,000 μm, a pore volume of from 0.3 to 5 cm³/g and a surface area of from 100 to 1,000 m²/g, is of the formula SiO₂ . a Al₂O₃, where a is from 0 to 2, and has a moisture content such that it loses from 1 to 20% by weight, based on the initial total weight of the silica gel, of water at 1000° C. in the course of 0.5 hour, (Ib) an organomagnesium compound of the formula MgR³R⁴, where R³ and R⁴ are each C₂-C₁₀-alkyl, and (Ic) a gaseous chlorinating agent of the formula ClZ, where Z is Cl or H, by a method in which first (1.1.1) in a first sub-stage, in a liquid inert hydrocarbon, with constant thorough mixing at from 10° to 120° C., the finely divided silica gel (Ia) and the organomagnesium compound (Ib) are combined, from 1 to 10 molar parts of the organomagnesium compound (Ib) being used per 10 molar parts of silicon of the silica gel (Ia), and the combined substances are kept at from 20° to 140° C., for from 0.5 to 5 hours, then (1.1.2) in a second sub-stage, with constant thorough mixing at from −20° to +80° C., the gaseous chlorinating agent (Ic) is passed into the mixture obtained from the first sub-stage, from 2 to 40 molar parts of the chlorinating agent (Ic) being used per molar part of the organomagnesium compound (Ib), the entire mixture is left at a temperature in the stated range for from 0.5 to 5 hours and the resulting solid-phase product, ie. the carrier (I), is isolated with removal of the liquid phase, thereafter (1.2) in a second stage, a solid-phase intermediate is prepared from (I) the carrier obtained in the first stage, (II) a C₁-C₈-alkanol, (III) titanium tetrachloride and (IV) a phthalic acid derivative of the formula

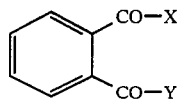

where X and Y together are oxygen or X and Y are each chlorine or C₁-C₁₀-alkoxy, by a method in which first (1.2.1) in a first sub-stage, in a liquid inert hydrocarbon, with constant thorough mixing at room temperature, the carrier I) and the alkanol (II) are combined, from 1 to 5 molar parts of the alkanol (II) being used per molar part of magnesium of the carrier (I), and the combined substances are kept at from 20° to 140° C. for from 0.5 to 5 hours, then (1.2.2) in a second sub-stage, with constant thorough mixing at room temperature, the titanium tetrachloride (III) is introduced into the reaction mixture resulting from the first sub-stage, from 2 to 20 molar parts of the titanium tetrachloride (III) being used per molar part of magnesium of the carrier (I), the combined substances are kept at from 10° to 150° C. for from 0.5 to 5 hours, and the resulting solid-phase intermediate is isolated with removal of the liquid phase, with the proviso that the phthalic acid derivative (IV) is introduced in the course of one or both of the substages (1.2.1) and (1.2.2), from 0.01 to 1 molar part of the phthalic acid derivative (IV) being used per molar part of magnesium of the carrier (I), then (1.3) in a third stage, the solid-phase intermediate obtained from the second stage is subjected, at from 100° to 150° C., for from 0.2 to 5 hours, to a single-stage, multistage or continuous extraction with titanium tetrachloride or a mixture of titanium tetrachloride and an alkylbenzene of not more than 12 carbon atoms, which contains not less than 5% by weight of titanium tetrachloride, a total of from 10 to 1,000 parts by weight of the extracting agent being used per 10 parts by weight of the solid-phase intermediate obtained from the second stage, and finally (1.4) in a fourth stage, the solid-phase product formed in the third stage is washed with a liquid inert hydrocarbon, until the hydrocarbon contains less than 2% by weight of titanium tetrachloride, and the titanium component (1) is thus obtained, and (β) polymerization is carried out by a method in which (a) in the first polymerization zone, the reaction is carried out under a total pressure of from 20 to 40 bar and at from 60° to 90° C., with the proviso that the mean residence time of the polymer is from 1.5 to 5 hours, (b) in the second polymerization zone, the reaction is carried out under a total pressure of from 7 to 25 bar and at from 40° to 7020 C., with the proviso that the ratio of the propylene partial pressure to the ethylene partial pressure is from 100:20 to 100:120, (c) the total pressure in the first polymerization zone is kept at least 7 bar higher than the total pressure in the second polymerization zone, (d) the ratio of the propylene converted into polymer in the first polymerization zone to the weight of the propylene/ethylene mixture converted into polymer in the second polymerization zone is from 100:40 to 100:150, and (e) the mean residence time of the polymer in the second polymerization zone is equal to the mean residence time of the polymer in the first polymerization zone multiplied by 0.8–1.2 times the quotient of the amount of polymer discharged hourly from the first polymerization zone to the amount of polymer discharged hourly from the second polymerization zone.

* * * * *